United States Patent
Rodrigues et al.

(10) Patent No.: US 10,727,779 B2
(45) Date of Patent: Jul. 28, 2020

(54) SOLAR PANEL ROOF SYSTEM WITH RAISED ACCESS PANELS

(71) Applicant: Building Materials Investment Corporation, Dallas, TX (US)

(72) Inventors: Tommy F. Rodrigues, Nutley, NJ (US); Sudhir Railkar, Wayne, NJ (US); Daniel E. Boss, Murphy, TX (US); David J. Gennrich, Fitchburg, WI (US); Cory Boudreau, Lake Elmo, MN (US); Daniel R. Nett, Sun Prairie, WI (US); Kent J. Kallsen, Jefferson, WI (US)

(73) Assignee: Building Materials Investment Corporation, Dallas, TX (US)

( * ) Notice: Subject to any disclaimer, the term of this patent is extended or adjusted under 35 U.S.C. 154(b) by 406 days.

(21) Appl. No.: 14/043,090

(22) Filed: Oct. 1, 2013

(65) Prior Publication Data

US 2014/0090696 A1 Apr. 3, 2014

Related U.S. Application Data

(60) Provisional application No. 61/708,234, filed on Oct. 1, 2012.

(51) Int. Cl.
*H02S 20/23* (2014.01)
*H02S 40/32* (2014.01)

(52) U.S. Cl.
CPC ............. *H02S 20/23* (2014.12); *H02S 40/32* (2014.12); *Y02B 10/12* (2013.01); *Y02B 10/14* (2013.01)

(58) Field of Classification Search
CPC ......... H02S 20/24; H02S 20/30; H02S 40/345
USPC ................................................. 136/242–265
See application file for complete search history.

(56) References Cited

U.S. PATENT DOCUMENTS

| 5,951,785 A | 9/1999 | Uchihashi et al. |
| 6,066,796 A * | 5/2000 | Itoyama ............ H01L 31/02008 136/251 |
| 7,534,956 B2 * | 5/2009 | Kataoka ................ H01L 31/048 136/243 |

(Continued)

OTHER PUBLICATIONS

SolarGain: Solar Energy Specialists, "APS—Micro Inverter Technology," http://www.solargain.com.au/aps-micro-inverter, Apr. 10, 2013.

(Continued)

*Primary Examiner* — Magali P Slawski
*Assistant Examiner* — Kourtney R S Carlson
(74) *Attorney, Agent, or Firm* — Womble Bond Dickinson (US) LLP

(57) ABSTRACT

A solar module for a roof covering system that generates electrical power from sunlight includes a frame having a bottom surface supported on a deck of a roof, a top surface, and a thickness between the bottom surface and the top surface. The solar module also includes a solar element mounted to the top surface of the frame which has an upper surface, a micro-inverter mounted to the top surface of the frame and to the side of the solar element, and a raised access panel that is removably coupled to the frame to surround the micro-inverter. The raised access panel has an access panel top surface that is elevated above the upper surface of the solar element. top surface of the frame forms a water shedding surface below the micro-inverter for directing water away from the roof.

13 Claims, 4 Drawing Sheets

(56) References Cited

U.S. PATENT DOCUMENTS

| | | | |
|---|---|---|---|
| 7,819,114 B2 | 10/2010 | Augenbraun et al. | |
| 7,824,191 B1 | 11/2010 | Browder | |
| 8,371,076 B2 | 2/2013 | Jones et al. | |
| 2005/0000562 A1 | 1/2005 | Kataoka et al. | |
| 2007/0266660 A1* | 11/2007 | Davies | E04D 5/12 |
| | | | 52/309.1 |
| 2010/0059104 A1* | 3/2010 | Geary | E04D 11/00 |
| | | | 136/251 |
| 2011/0036386 A1 | 2/2011 | Browder | |
| 2011/0048507 A1 | 3/2011 | Livsey | |
| 2011/0058337 A1* | 3/2011 | Han | H02S 40/34 |
| | | | 361/717 |
| 2011/0132427 A1 | 6/2011 | Kalkanoglu | |
| 2011/0138599 A1* | 6/2011 | Bellacicco | F24J 2/5211 |
| | | | 29/428 |
| 2011/0302859 A1* | 12/2011 | Crasnianski | F24J 2/4614 |
| | | | 52/173.3 |
| 2012/0212065 A1 | 8/2012 | Cheng et al. | |
| 2012/0240490 A1 | 9/2012 | Gangemi | |
| 2013/0014455 A1* | 1/2013 | Grieco | H02S 20/24 |
| | | | 52/173.3 |

OTHER PUBLICATIONS

Wholesale Solar, "AUO AC Unison PM250MA0 250-watt AC Solar Panel," http://www.wholesalesolar.com/products.folder/module-folder/AUO/AC-Unison-PM250MA0.html, Apr. 10, 2013.

* cited by examiner

SOLAR PANEL ROOF SYSTEM WITH RAISED ACCESS PANELS

RELATED APPLICATIONS

This application claims the benefit of U.S. Provisional Patent Application No. 61/708,234, filed on 1 Oct. 2012, and entitled "Solar Panel Roof System With Raised Access Panels", which application is incorporated by reference in its entirety herein.

TECHNICAL FIELD

This application relates generally to solar power and more specifically to electric solar collectors for placement on the shingled roof of a structure such as a residential home.

BACKGROUND

The trend toward alternate energy sources has lead in recent years to a demand for wind, geothermal, solar, hydrogen, and other sources of energy that do not derive from fossil fuels. The capturing of solar energy includes, without limitation, the collection and storage of heat from the sun and the collection and storage of electricity derived from sunlight. In the later case, solar cells and multi-cell solar panels have been developed that convert sunlight directly into electrical energy, which then may be used, stored in batteries, and/or placed back on the electrical grid. While solar panels are feasible in many applications, such as on industrial and commercial buildings, some consider them unsightly for use on roofs of residential homes. Further, traditional solar panels cover the shingles of a residential home, obscuring the architectural contribution of the shingles to the home. There is a need for a system to collect solar energy from the roof of a residential home that is not unsightly and that is integrated into and actually enhances the architectural appearance of the shingles of the home. It is to the provision of such a system that the present invention is primarily directed.

SUMMARY

Briefly described, a solar module for a solar roof covering system which generates electrical power, and which solar module includes a frame having a bottom surface that is supported on the deck of a roof, a top surface, and a thickness between the bottom surface and the top surface. The solar module also includes a solar element having a photo-sensitive upper surface mounted to the top surface of the frame, and a micro-inverter mounted to the top surface of the frame and to one side of the solar element. The solar module further includes a raised access panel that covers the micro-inverter and is removably coupled to the frame, and with a top surface of the access panel that is elevated above the upper surface of the solar element. In addition, the top surface of the frame forms a water shedding surface below the micro-inverter for directing water away from the roof.

The thickness of the frame can be variable, generally being thicker toward a front (i.e. lower) edge of the frame and thinner toward an back (i.e. upper) edge of the frame, and configured so that the lower, front edge of a course of solar modules can overlap the back, upper edges of a previously-installed course of solar modules. The top surface of the frame may also include receptacles for receiving the solar element and/or the micro-inverter therein, while still maintain its water-shedding functionality. In addition, the raised access panel can include one or more ventilation apertures for venting heat from the micro-inverter.

The invention will be better understood upon review of the detailed description set forth below taken in conjunction with the accompanying drawing figures, which are briefly described as follows.

DETAILED DESCRIPTION

Figure 1:
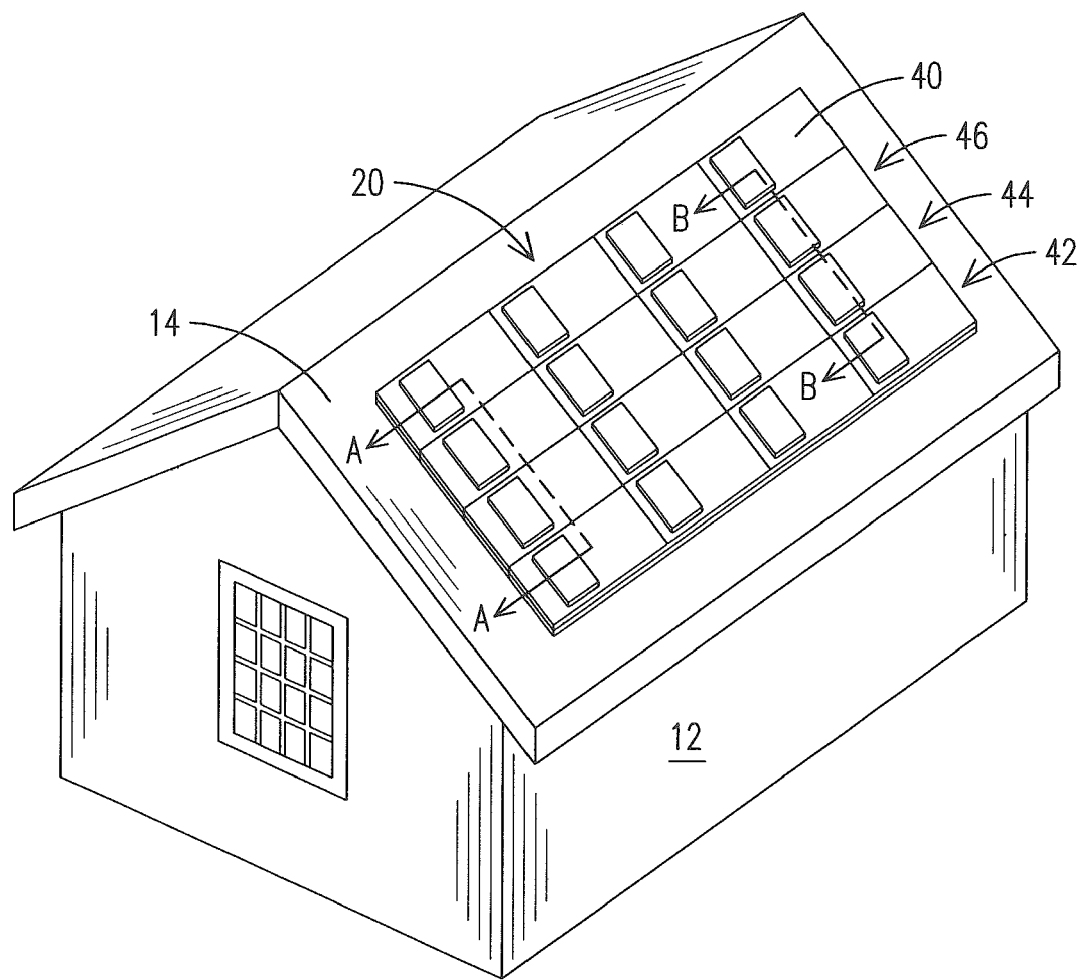
FIG. 1 is a perspective view of a solar roof covering system for generating electrical power from sunlight, in accordance with one representative embodiment.

Referring now in more detail to the drawing figures, wherein like parts are identified with like reference numerals throughout the several views, FIG. 1 illustrates a solar roof covering system 20 for generating electrical power, in accordance with one representative embodiment of the disclosure. The roof covering system 20 can be mounted directly to the roof deck 14 of a structure or building 12 to form a portion of the roof 10 thereof, and can include a plurality of solar shingles or solar modules 40 arranged in overlapping courses 42, 44, 46, etc., and attached to the roof deck 14. As shown in FIG. 1, the modules 40 can be configured so that each course 42, 44, 46 of solar modules 40 can be aligned with the courses below and above, so that the various surface features and joints between the modules 40 are also vertically aligned in an aesthetically-pleasing manner. Moreover, as will be discussed in more detail below, the aligned courses 42, 44, 46 can provide complete water-shedding coverage for the roof 10 so that rain, snow and ice are generally prohibited from contacting the roof deck 14 below. Although not shown in FIG. 1, the courses 42, 44, 46 of solar modules 40 may also be staggered across the planar section of the roof 10 in the more traditional manner.

Figure 2:
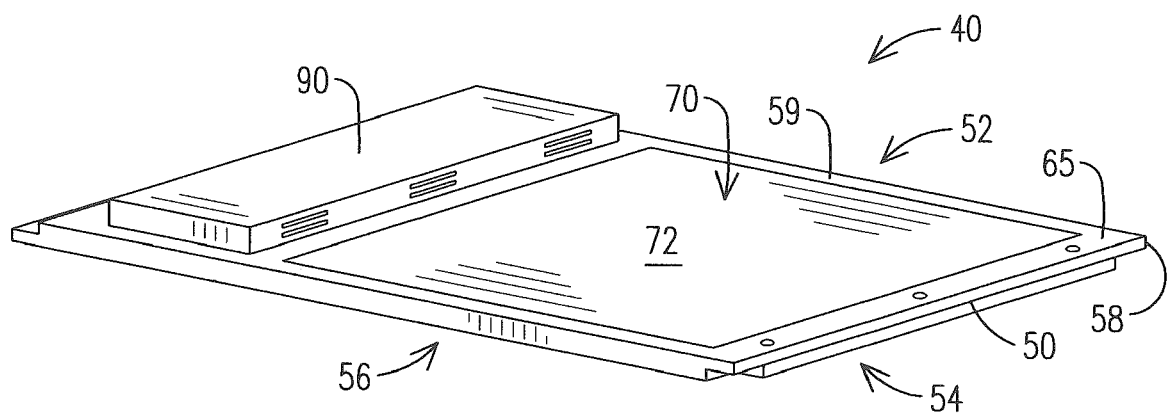
FIG. 2 is a perspective view of a solar module for the solar roof covering system of FIG. 1, in accordance with another representative embodiment.
Figure 3:
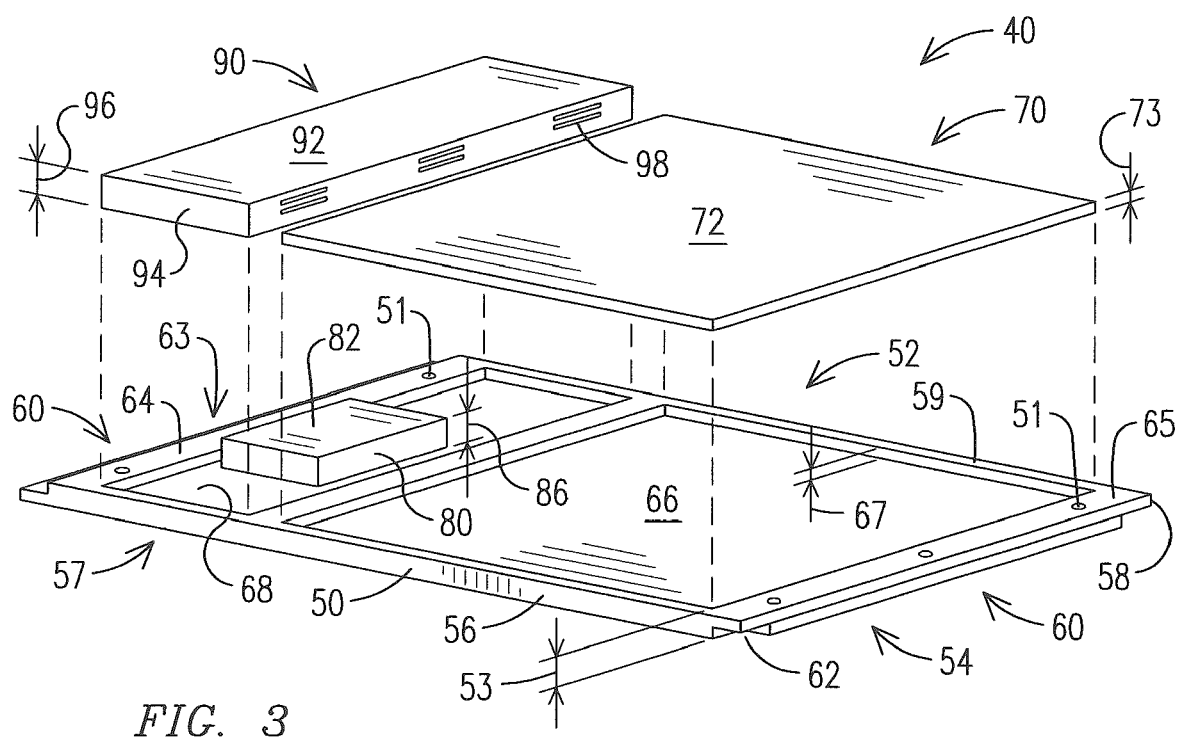
FIG. 3 is an exploded view of the solar module of FIG. 2

One representative embodiment of the solar module 40 is illustrated in more detail in FIGS. 2-7. Referring first to FIGS. 2 and 3, the solar module 40 generally includes a frame 50 with a top surface 52, a solar element 70 mounted to the frame and covering a majority portion of the top surface 52, and a raised access panel 90 located to the side of the solar element 70 and covering a minority portion of the top surface 52. The access panel 90 generally covers and protects a micro-inverter 80 that is mounted to the frame 50 to the side of the solar element 70 and in electrical communication with the solar element 70. In some embodiments, each of the solar modules 40 can include a micro-inverter 80 mounted adjacent to and in electrical communication with the solar element 70, so that there is a 1:1 ratio between solar elements 70 and micro-inverters 80 across the roof covering system 20 (FIG. 1). Furthermore, each of the micro-inverters 80 in the roof covering system 20 can be electrically connected via electrical cabling to one or more power collection nodes (not shown), which in turn direct the electrical power received from the plurality of solar modules to an electrical utility grid.

In other embodiments of the disclosure, the micro-inverter 80 is an optional component that is not required to be mounted to every module 40 of the roof covering system 20. For example, each of the solar elements 70 in a group of two or more solar modules 50 can be electrically coupled to the same micro-inverter 80 mounted to just one of the solar modules in the group. In this case, the access panels 90 for the solar modules 40 without micro-inverters 80 can instead cover and protect the electrical cabling running between the solar element 70 and the other solar modules 40 in the group.

The solar elements 70 can generally comprise a plurality of photovoltaic cells that are sandwiched between a bottom panel and a top layer of glass, and may be supplied by third parties for installation into the solar module 40. As known to one of skill in the art of photovoltaic devices, solar elements without electronic conditioning, such as the solar element 70 shown in FIGS. 2-3, generally output electrical power as direct current (DC). Unless connected to a corresponding electrical device that is adapted to receive DC power, the DC output from the solar elements must be converted into alternating current (AC) power before it can be connected to an electrical grid system (e.g. a public utility grid, an independent electrical grid for a privately-owned facility, and the like) or used to power an AC device. The conversion from DC power to AC power is performed with an electrical inverter configured to receive the direct current output from the solar element at a predetermined voltage.

As DC/AC inverters are usually one of the more-expensive components of electrical solar power systems, large numbers of solar elements are often wired together in series and electrically coupled to a single inverter, which is typically located several meters away from the bank of solar elements. Although often lower in initial cost, such systems require extra care in achieving electrical balancing and are usually less efficient due to shading effects and transmission losses. In contrast, converting the DC power from each individual solar element to AC power with a dedicated inverter located closer to the solar element may have higher initial costs, but typically results in a simpler electrical solar power system that is more efficient and less prone to shading losses. Electrical inverters which are sized for the lower DC output from a single solar element or from a small number of panels are commonly-termed micro-inverters, such as the micro-inverter 80 shown in FIG. 3.

In one aspect of the present disclosure, the frame 50 of the solar module 40 can have sufficient thickness 53 between the top surface 52 and the bottom surface 54 to allow for allow for a receptacle 66 to be formed into the top surface 52 that is sized and shaped to receive the solar element therein, and that is surrounded by a perimeter edge surface 65. The receptacle 66 can have a depth 67 corresponding to the thickness 73 of the solar element 70 so that the upper surface 72 of the solar element 70 is substantially flush with the perimeter edge surface 65 of the frame when solar element 70 is installed within the receptacle 66. In other aspects, the depth 67 of the receptacle 66 can be less than or greater than thickness 73 of the solar element 70, so that alternatively the upper surface 72 of the solar element is positioned above or below the perimeter edge surface 65 of the frame 50, respectively.

The solar element 70 can have a thickness 73 which ranges up to about ½ inch or greater, but which generally is less than or about ¼ inch. As such, the thickness 53 of the frame 50 proximate the solar element can be at least 50% greater than the thickness 73 of the solar element 70 to provide structural support for the solar element. In one aspect, the frame 50 can be formed from a stiff or rigid material to support the solar element 70, which may also be rigid. In other aspects, however, and especially with solar elements 70 that are flexible, the frame 50 can be formed from a resilient material that better conforms and seals against the underlying courses of solar modules. The frame 50 may be manufactured using generally-available extrusion or injection molding manufacturing processes and techniques.

In the embodiment of the present disclosure illustrated in FIGS. 2-5, the frame 50 can also include a micro-inverter receptacle 68 formed into the top surface 52 and to one side of the solar element receptacle 66. The micro-inverter receptacle 68 can have the same depth 67 as the solar element receptacle 66, with the perimeter edge surface 65 also surrounding the micro-inverter receptacle 68. However, as many micro-inverters 80 currently available have a height 86 that is greater than the thicknesses 73 of the solar element 70, the top surface 82 of the micro-inverter 80 will generally be elevated above the upper surface 72 of the solar element 70 when mounted to surfaces having the same elevation. In addition, the raised access panel 90 which covers and protects the micro-inverter 80 will also have a height 96 sufficient to accommodate the height 86 of the micro-inverter 80, and an access panel top surface 92 that is also elevated above the upper surface 72 of the solar element 90.

The micro-inverter 80 can be electrically connected to the solar element 70 through a variety of methods, including wiring and connectors (not shown) that are embedded or directed through the material of the frame 50, so as to be hidden from view from an outside observer when the access panel 90 is attached to the frame 50. Wiring conduits 48 (FIG. 4) that provide pathways for cables 30 extending between laterally-adjacent modules (along-the-course) and vertically-adjacent modules (course-to-course) may also be formed into the frame and configured to be invisible from an outside observer once the installation of the roof covering system is complete.

The raised access panel 90 can be configured to provide ventilation for the micro-inverter 80 through the use of apertures 98 formed through the top surface 92 or vertically-oriented sidewalls 94 of the access panel 90. According to some embodiments, as clearly depicted, for example, in FIG. 3, FIG. 4 and FIG. 5, a plurality of apertures 98 are formed, for example, through the vertically-oriented sidewalls 94 of the access panel 90. The apertures 98 are positioned at a height above the upper surface 72 of the solar element 70, when the access panel and solar element are mounted on the frame 50. According to some embodiments, a plurality of apertures 98 is positioned in each of the opposing sidewalls 94. As depicted in FIG. 1, laterally-adjacent modules 40 can, in some environments, be placed with the solar element 70 of one module located proximate the access panel 90 of the adjacent module. In some aspects, the apertures 98 can be one or more groupings of holes formed through the walls of the access panel 90, or outwardly-punched louvers which can help to redirect rain and moisture away from the apertures 98. In other aspects, the inside surfaces of the access panel 90 can be lined with a mesh or membrane (not shown) which further resists the passage of moisture while allowing for the passage of heated air out of the covered spaced surrounding the micro-inverter 80. Even with one or more moisture barriers configured into the access panel 90, however, it is considered that water may be able to pass through the access panel 90 under certain conditions and wet the micro-inverter 80 and its associated cabling. Thus, each of the micro-inverter 80, the cabling 30, and the various connections can be weather-resistant and rated for outdoor use, and the frame 50 of the module 40 can be configured to provide a water-shedding barrier below the micro-inverter 80 which prevents water from reaching the decking 14 of the roof 10.

Figure 4:
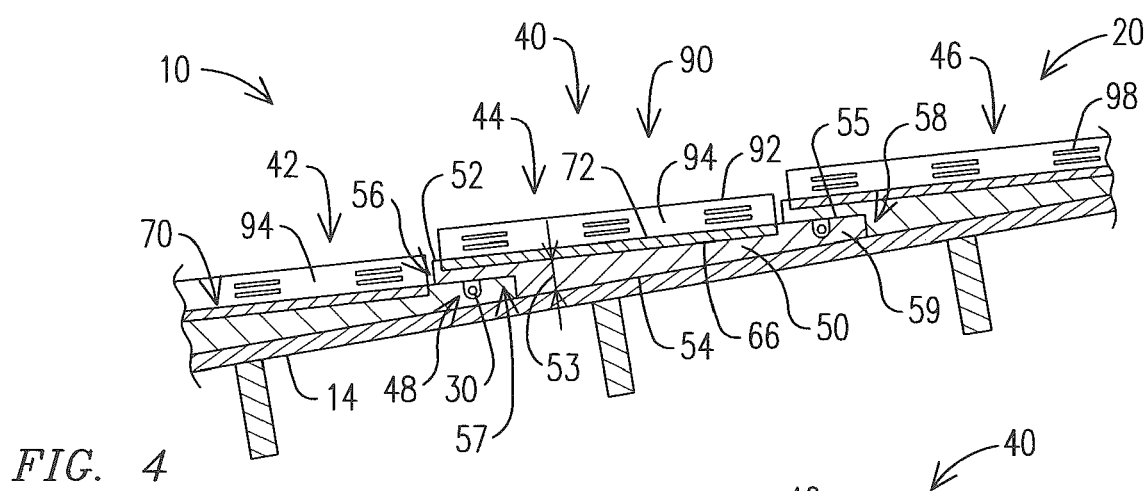
FIG. 4 is a cross-sectional side view of the solar module of FIG. 2, as viewed from section line A-A in FIG. 1.

FIG. 4 is a cross-section of several overlapping courses 42, 44, 46 of modules 40 taken through the solar elements 70, as viewed from section line A-A of FIG. 1. As can be seen, in one aspect the frame 50 can have a generally-triangular shape with a variable thickness 53 that is thicker toward the front (i.e. lower) edge 56 and thinner toward the back (i.e. upper) edge 58. A front underside recess portion 57 can be formed into the bottom surface 54 of the frame 50 proximate the front, lower edge 56, and which recess 57 is sized and shaped to receive, in overlapping fashion, a back extension portion 59 of a lower adjacent frame. As such, the front, lower edges 56 of the center course 44 of module frames 50 overlap the back, upper edges 58 of the previously-installed lower course 42 of module frames 50 to form an interlocked water-shedding surface which directs water down and away from the roof covering system.

In the illustrated embodiment, the underside surface of the solar element 70 is installed within the solar element receptacle 66 formed into the top surface 52 of the frame 50, so that the upper surface 72 of the solar element 70 is substantially flush with and surrounded by the perimeter edge surface 65 of the frame 50. As such, the portion of the frame material surrounding the solar element 70 can provide structural support and protection to the edges of the solar element 70. The top surface 52 of the frame 50 also extends over the back extension portion 59 that is covered by the front underside recess portion 57 of the upper adjacent frame in the next upper course 46 of modules 40, to form an overlapping, water-tight joint 55 between the two modules.

In another aspect of the disclosure, the back extension portion 59 of the frame 50 has a thickness sufficient to form channels 48 adapted to receive cabling 30 extending between laterally-adjacent modules (along-the-course) and vertically-adjacent modules (course-to-course), prior to having the next upper course 46 of modules 40 installed over the back extension portion 59 of the center course 44 of modules, to cover and seal the channels. The channels 48 can be configured in a variety of ways known to one of skill in the art, including thru-holes, U-shaped channels, and the like.

Figure 5:
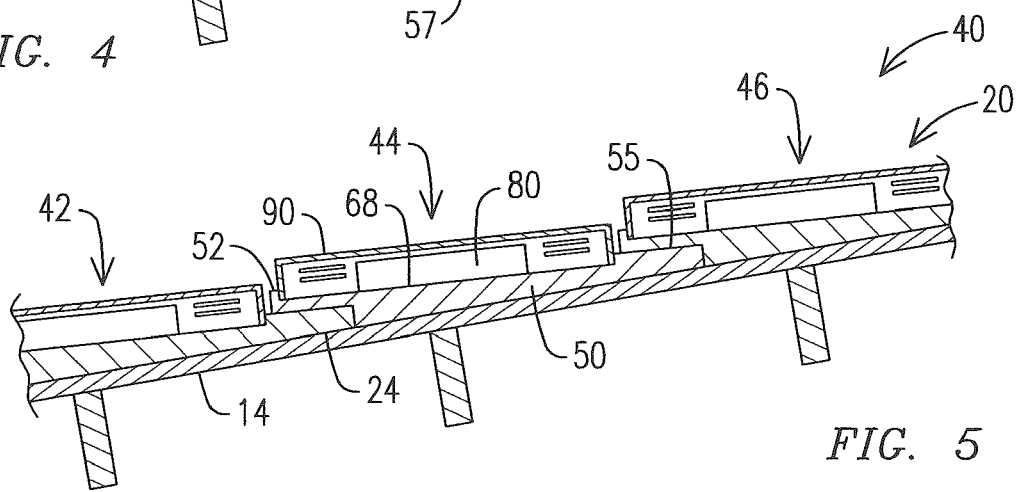
FIG. 5 is a cross-sectional side view of the solar module of FIG. 2, as viewed from section line B-B in FIG. 1.

FIG. 5 is a cross-section of the several overlapping courses 42, 44, 46 of modules 40 taken through the micro-inverters 80 and removable access panels 90, as viewed from section line B-B of FIG. 1. The micro-inverter 80 may not fill the volume defined by the micro-inverter receptacle 68 formed into the top surface 52 of the frame 50 and the raised access panel 90, thus providing room for additional cabling and accessories, as needed. Drainage passages (not shown) can also be provided near the front, lower portion of the sloped micro-inverter receptacle 68 to allow any water entering through the ventilation apertures 98 in the access panel 90 to quickly drain out onto the top surface of a lower adjacent frame.

Figure 6:
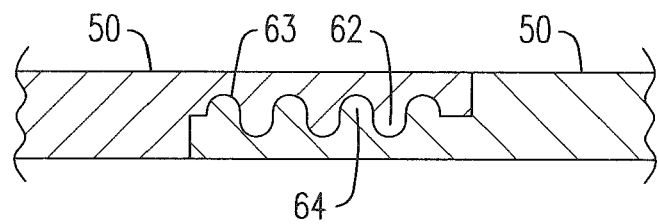
FIG. 6 is a cross sectional view of a side lap joint between two solar modules for the roof covering system of FIG. 1, in accordance with another representative embodiment.

The side edges 60 of the frames 50 can also interconnect in overlapping fashion to avoid providing any vertical side joints which might allow water to penetrate between module frames and reach the roof decking below. As shown in FIGS. 3 and 6, for example, the side edges 60 of the frames 50 can include alternating downward facing lap joints 62 and upward facing lap joints 64 having complimentary grooved or ridged surfaces 63 which prevent water from traveling laterally between the lap joints 62, 64, and instead re-direct the water downward and forward to exit the side joints at the front edge 56 of the frame 50.

Referring back to FIG. 3, the frame 50 of the solar module 40 can be mounted to the roof deck 14 with fasteners installed through a series of mounting holes 51 formed through the frame 50 in between solar element 70 and lap joint 62 and in between access panel 90 and lap joint 64. The mounting holes 51 can include recessed portions to received the heads of the fasteners as well as plugs which can cover the fasteners to provide a more uniform appearance to the installed solar module 40. Of course, different locations for the mounting holes 51 are also possible, the orientation of the lap joints 62, 64 can be reversed, and other forms of water-resistant side interconnections can also be used, as noted above.

Figure 7:
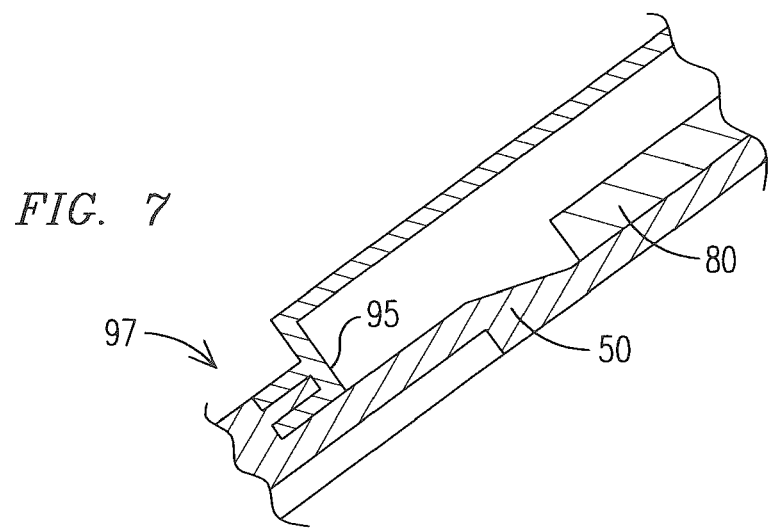
FIG. 7 is a cross-sectional view of a joint between the frame and the raised access panel of a solar module, in accordance with another representative embodiment.
Figure 8:
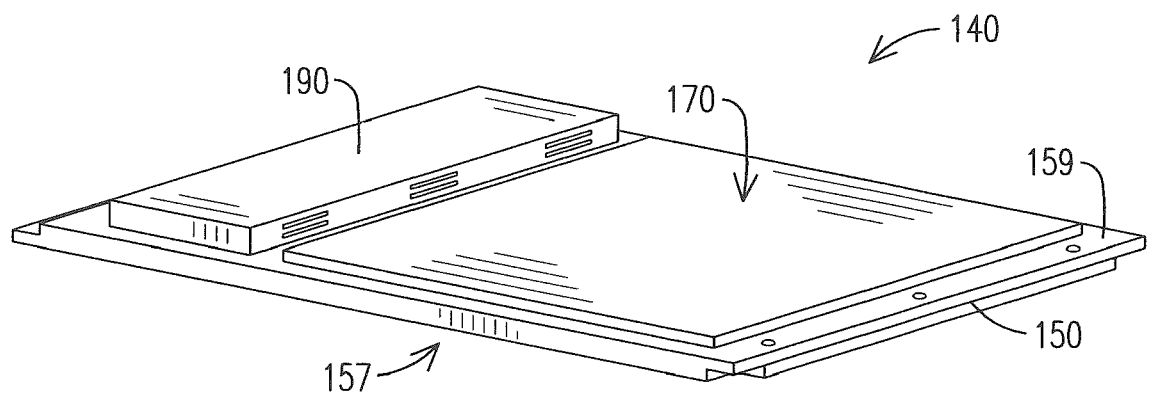
FIG. 8 is a perspective view of a solar module for the solar roof covering system of FIG. 1, in accordance with another representative embodiment.
Figure 9:
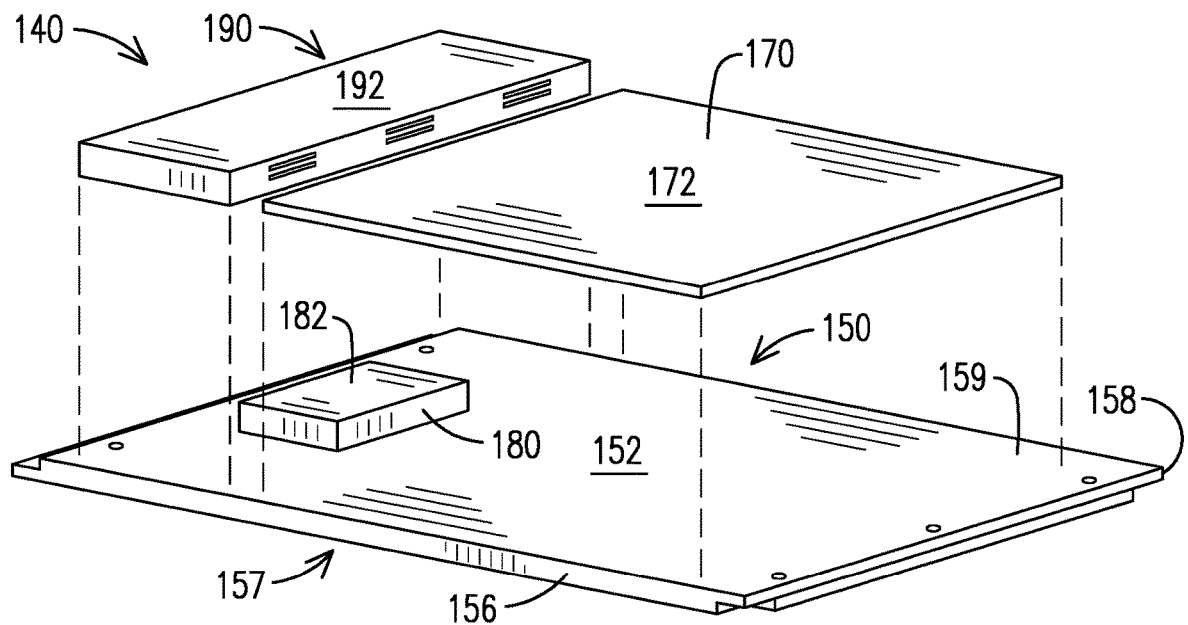
FIG. 9 is an exploded view of the solar module of FIG. 8.
Figure 10:
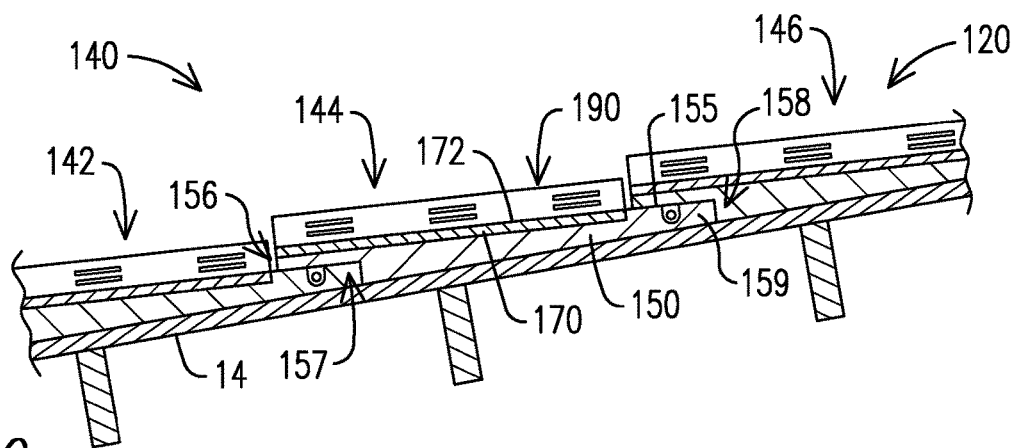
FIG. 10 is a cross-sectional side view of the solar module of FIG. 8, as viewed from section line A-A in FIG. 1.

In addition, the raised access panel 90 can be securely coupled to the frame 50 in a manner than does not include fasteners which would be visible to an outside observer. For example, as shown in FIG. 7, one of the lower edges 95 of the raised access panel 90 can form a portion of a sliding tongue-and-groove joint 97 which does not require fasteners, with one of more of the other three lower edges of the access panel 90 being removably coupled to the frame 50 with clips (not shown, but known to one of skill in the art). Other mechanisms for removably coupling the access panel 90 to the frame 50 are also possible and considered to fall within the scope of the present disclosure.

Another representative embodiment of the solar module 140 is illustrated in FIGS. 8-11. Similar in many respects to the embodiment described above, the frame 150 of the solar module 140 does not include receptacles for the solar element 170 or for the micro-inverter 180. Instead, each of the additional components 170, 180, 190 of the module 140 are mounted directly to the substantially-planar top surface 152 of the frame 150. In this embodiment, the top surface 152 of the frame 150 can provide a more uniform water shedding surface. In addition, the solar element 170 can span substantially the entire distance between the front edge 156 of the frame 150 and the front edge of the upper adjacent frame in the next upper course 146 of modules 140, so as to provide a photo-sensitive upper surface 172 having additional surface area for receiving sunlight and generating additional electricity. This still allows for the back extension portion 159 of the frame 150 to be received within the front underside recess portion 157 formed into the front edge 156 of the upper adjacent frame and establish the overlapping, water tight joint 155.

Figure 11:
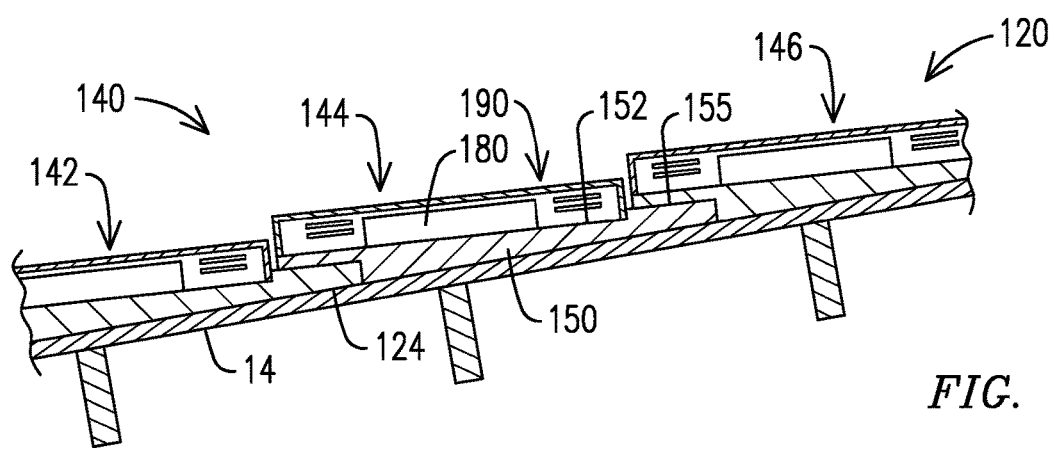
FIG. 11 is a cross-sectional side view of the solar module of FIG. 8, as viewed from section line B-B in FIG. 1.

As further illustrated in FIGS. 5 and 11, respectively, the roof covering systems 20, 120 can also include an additional water resistant barrier or layer 24, 124, such as a waterproof membrane made from TPO or roofing felt, so that any incidental water seeping beneath the solar modules 40, 140 is also shed from below.

The invention has been described in terms of preferred embodiments and methodologies considered by the inventors to represent the best mode of carrying out the invention. A wide variety of additions, deletions, and modification might well be made to the illustrated embodiments by skilled artisans within the scope of the invention. For example, the top surface of the frame may include a receptacle for the solar element formed therein, but not a receptacle for the micro-inverter. In addition, both the micro-inverter and the raised access panel may be formed with an aspect ratio that is more narrow and elongate than that shown therein, may be located along either side edge or even along the back edge of the solar module. These and other revisions might be made by those of skill in the art without departing from the spirit and scope of the invention, with is constrained only by the following aspects.

According to at least one embodiment, as depicted in the drawings, the frame 50 is generally rectangular in planar view, with the rectangular boundary of the frame being defined by the first side edge 60, the opposing second side edge 60, the front edge 56 extending from the first side edge to the second side edge, and the back edge 58 extending from the first side edge to the second side edge. As seen in the drawings, such an embodiment is characterized by the solar element 70, the micro-inverter 80, and the raised access panel 90 all being positioned on the frame fully within the rectangular boundary.

What is claimed is:

1. A solar module for a roof-mounted solar power system for generating electrical energy from sunlight, the solar module comprising:
   a rectangular frame having length-wise edges and width-wise edges with the width-wise edges being shorter than the length-wise edges; a bottom surface, a top surface, and a thickness between the bottom surface and the top surface;
   a rectangular solar element having length-wise edges and width-wise edges, an upper surface adapted to generate electrical energy from sunlight, and an underside surface mounted to the top surface of the frame;
   the solar element being sized and positioned on the frame with its length-wise edges disposed adjacent the length-wise edges of the frame, with one of its width-wise edges disposed adjacent a width-wise edge of the frame, and with the other one of its width-wise edges spaced from the other width-wise edge of the frame to define a region of the frame to a side of the solar element that is not covered by the solar element;
   a micro-inverter mounted to the frame within the region of the frame not covered by the solar element;
   a rectangular access panel surrounding, completely enclosing, and covering the micro-inverter and being removably attached to the frame, the access panel having length-wise edges of the same length as the width-wise edges of the solar element and width-wise edges that are co-linear with the length-wise edges of the solar element, an access panel top surface located at a level above the upper surface of the solar element, sidewalk extending downward from the access panel top surface toward the frame top surface; and a plurality of apertures formed in at least two of the sidewalls for venting heat from the micro-inverter, wherein each of the apertures is located at a level above the upper surface of the solar element; and
   wherein the frame includes a recess portion below a front edge and an extension portion along a back edge, the extension portion being receivable into a recess portion of an upper course of modules to form a water-tight joint.

2. The solar module of claim 1, further comprising a receptacle formed into the top surface of the frame and surrounded by a perimeter edge surface, and wherein the solar element is located within the receptacle so that the upper surface of the solar element is substantially flush with the perimeter edge surface of the frame.

3. The solar module of claim 1, further comprising a water resistant barrier adjacent the bottom of the module.

4. The solar module of claim 1, wherein the frame includes lap joints along the side edges thereof for coupling with a frame of a laterally-adjacent module.

5. The solar module of claim 1, wherein the frame is formed from a resilient material.

6. A roof covering system for generating electrical energy from sunlight, the roof covering system comprising:
   a plurality of solar modules in at least partially overlapping courses, each solar module including:
   a rectangular frame having a length in a horizontal direction and a width in a vertical direction with the width being less than the length, a bottom surface supported on a deck of the roof, a top surface, a thickness between the bottom surface and the top surface, and a receptacle formed into the top surface surrounded by perimeter edge portions of the top surface of the rectangular frame;
   a rectangular solar element having a length in the horizontal direction and a width in the vertical direction, an upper surface adapted to generate electrical energy from sunlight, and an underside surface mounted within the receptacle of the frame so that the upper surface of the solar element is substantially flush with the perimeter edge portions of the top surface of the frame;
   the length of the solar element being less than the length of the frame to define a region of the frame to one side of the solar element that is not covered by the solar element;
   electrical components mounted to the frame within the region of the frame not covered by the solar element;
   a rectangular access panel surrounding the electrical components and removably attached to the frame, the access panel having an access panel top surface disposed at a level above the perimeter edge portions of the top surface of the frame, four sidewalls extending downward from the access panel top surface toward the frame top surface, and a plurality of apertures formed in at least two of the sidewalls for venting heat from the electrical components covered by the access panel, each of the apertures being located at a level above the upper surface of the solar element;
   the rectangular access panel of each of the plurality of solar modules being exposed;
   the rectangular access panel having a length in the vertical direction substantially the same as the width of the solar element, the rectangular access panel being aligned in the vertical direction with the solar element;
   at least one collection node for directing electrical energy received from the plurality of solar modules to an electrical utility grid;
   electrical cabling extending from the electrical components of the plurality of solar modules to the at least one collection node; and
   wherein the frame includes a recess portion below a front edge and an extension portion along a back edge, the extension portion being receivable into the recess portion of an upper course of modules to form a water-tight joint.

7. The roof covering system of claim 6, further comprising a water resistant barrier between the deck of the roof and the bottom of the module.

8. The roof covering system of claim 6, wherein the frame includes lap joints along the side edges thereof for coupling with a frame of a laterally-adjacent module.

9. The roof covering system of claim 6, wherein the frame is formed from a resilient material.

10. The solar module of claim 6, wherein the receptacle is a first receptacle, the solar module further comprising a second receptacle formed into the top surface of the frame and surrounded by the perimeter edge surface, and wherein the electrical components are located within the second receptacle so that a lower portion of the electrical components are recessed within the frame and so that an upper surface of the electrical components is raised above the perimeter edge surface of the frame.

11. The roof covering system of claim 6, wherein each course of the at least partially overlapping courses comprises a plurality of solar modules.

12. The roof covering system of claim 6, wherein laterally-adjacent modules of the plurality of solar modules are positioned with the solar element of one module located proximate the access panel of the adjacent module.

13. The roof covering system of claim 6, wherein, as to each solar module of the plurality of solar modules,
the frame includes a first side edge, an opposing second side edge, a front edge extending from the first side edge to the second side edge, and a back edge extending from the first side edge to the second side edge, the first, second, front, and back edges together defining a rectangular boundary of the frame, and
the solar element, the micro-inverter, and the raised access panel are all positioned on the frame fully within the rectangular boundary.

\* \* \* \* \*